(12) United States Patent
Cappelleri et al.

(10) Patent No.: US 11,905,005 B2
(45) Date of Patent: Feb. 20, 2024

(54) UNMANNED VEHICLES CAPABLE OF ENVIRONMENTAL INTERACTION

(71) Applicant: Purdue Research Foundation, West Lafayette, IN (US)

(72) Inventors: David J. Cappelleri, West Lafayette, IN (US); Daniel R. McArthur, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 166 days.

(21) Appl. No.: 17/403,706

(22) Filed: Aug. 16, 2021

(65) Prior Publication Data

US 2021/0380233 A1    Dec. 9, 2021

Related U.S. Application Data

(63) Continuation of application No. 16/109,873, filed on Aug. 23, 2018, now Pat. No. 11,091,256.

(60) Provisional application No. 62/550,199, filed on Aug. 25, 2017.

(51) Int. Cl.
| | | |
|---|---|---|
| *B64C 29/00* | (2006.01) | |
| *G05D 1/00* | (2006.01) | |
| *B64D 47/08* | (2006.01) | |
| *B64U 30/20* | (2023.01) | |
| *B64U 50/13* | (2023.01) | |
| *B64U 101/00* | (2023.01) | |

(52) U.S. Cl.
CPC ........ *B64C 29/0025* (2013.01); *G05D 1/101* (2013.01); *G05D 1/102* (2013.01); *B64D 47/08* (2013.01); *B64U 30/20* (2023.01); *B64U 50/13* (2023.01); *B64U 2101/00* (2023.01); *B64U 2201/10* (2023.01)

(58) Field of Classification Search
None
See application file for complete search history.

(56) References Cited

U.S. PATENT DOCUMENTS

| | | | |
|---|---|---|---|
| 2009/0018700 A1* | 1/2009 | Okamoto | B25J 13/083 901/9 |
| 2016/0008988 A1* | 1/2016 | Kennedy | B25J 15/08 414/738 |
| 2016/0023761 A1* | 1/2016 | McNally | B64C 39/024 701/3 |

(Continued)

*Primary Examiner* — Yuen Wong
*Assistant Examiner* — Hongye Liang
(74) *Attorney, Agent, or Firm* — Piroozi-IP, LLC

(57) ABSTRACT

An unmanned ground-based system is disclosed which includes a chassis, a plurality of wheels coupled to the chassis and configured to allow the chassis to move about a surface, a plurality of propeller assemblies configured to provide on-ground motion propulsions, a boom having a boom propeller assembly with a propeller disposed on a plane generally perpendicular to the plurality of propeller assemblies, configured to independently and selectively provide positive and negative rectilinear thrust vectors, and an end-effector coupled to a distal end of the boom, the end-effector having a force sensor configured to provide contact force between the end-effector and an object, wherein the contact force is used as a feedback signal to determine magnitude of the positive and negative rectilinear thrust vectors that is generated by the propeller of the boom propeller assembly.

20 Claims, 9 Drawing Sheets

(56) References Cited

U.S. PATENT DOCUMENTS

| 2017/0050726 A1* | 2/2017 | Yamada | B64C 27/20 |
| 2019/0291860 A1* | 9/2019 | Morgan | B64C 39/024 |
| 2020/0002000 A1* | 1/2020 | Dahlstrom | B64D 1/18 |

* cited by examiner

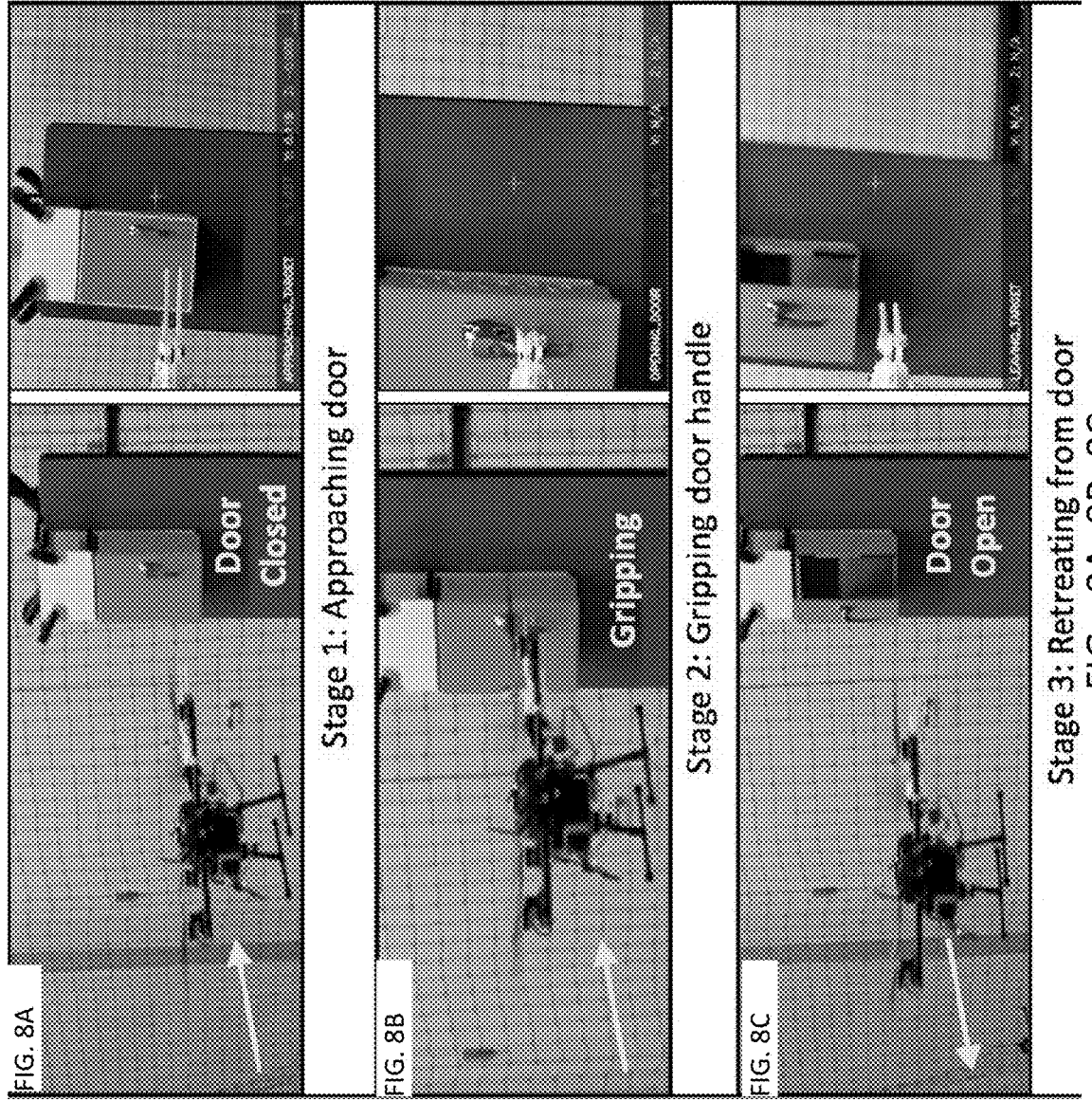

UNMANNED VEHICLES CAPABLE OF ENVIRONMENTAL INTERACTION

CROSS-REFERENCE TO RELATED APPLICATIONS

The present application is a continuation of a U.S. application Ser. No. 16/109,873 titled UNMANNED AERIAL VEHICLES CAPABLE OF ENVIRONMENTAL INTERACTION which was filed on 23 Aug. 2018, which is related to and claims the priority benefit of U.S. Provisional Patent Application Ser. No. 62/550,199 filed Aug. 25, 2017, the contents of each of which is hereby incorporated by reference in its entirety into the present disclosure.

STATEMENT REGARDING GOVERNMENT FUNDING

This invention was not made with government support.

TECHNICAL FIELD

The present disclosure generally relates to unmanned aerial vehicles (UAVs), and in particular for UAVs capable of interacting with their environments.

BACKGROUND

This section introduces aspects that may help facilitate a better understanding of the disclosure. Accordingly, these statements are to be read in this light and are not to be understood as admissions about what is or is not prior art.

Unmanned aerial vehicles (UAVs) are ubiquitous. These are found in myriad applications (e.g., inspection, surveillance, mapping, and precision farming, etc.). In these applications, the UAVs are operated in both a manual mode, whereby a pilot remotely pilots the UAV and operates controls on the UAV, as well as an autonomous mode, whereby the UAV's own controller plots a trajectory and autopilots the UAV to a place of interest as well operates various devices (e.g., an on-board camera).

Nowadays, more is expected from a UAV design. In particular, there is an interest for a UAV to interact with its environment. For example, some designs include object manipulation, such as pickup and release, transportation, as well as other inspection tasks requiring at least part of the UAV to make contact with an object.

To accomplish these tasks, vertical take-off and landing (VTOL) UAVs are now found in myriad applications. A common VTOL UAV is a quadcopter, which has four rotors. In most of the VTOL UAVs, however, due to cost constraints, UAVs do not decouple movement in all the desired degrees of freedom. Referring to FIG. 1, a schematic of a UAV is shown with desired 6 degrees of freedom. The six degrees of freedom include back-and-front, left-to-right, up-and-down, pitch, roll, and yaw. However, in most cases, these six degrees of freedom are not decoupled and provided to a controller as independent degrees of freedom. As such, there is an inherent coupling between the UAVs translational and rotational dynamics and thus it is unable to independently control the forces and torques in all dimensions. This lack of independence in the six degrees of freedom results in inability to control arbitrary velocities in a space defined by all six degrees of freedom. For example, a UAV may be hovering in a desired plane, i.e., being controlled on a plane defined by axes X-Y-Z (3 degrees of freedom) but unable to precisely maintain that plane and propel forward and backwards in order to perform a tedious task.

Therefore, there is an unmet need for a novel approach to control UAVs such that these vehicles can perform tedious tasks within an environment by decoupling propulsion in a plurality of degrees of freedom.

SUMMARY

An unmanned aerial vehicle (UAV) system is disclosed. The UAV system includes a chassis and a plurality of propeller assemblies configured to provide vertical take-off and landing (VTOL) for the chassis with propulsion in 6 degrees of freedom including along a cartesian coordinate system (X, Y, Z) and provide yaw, pitch, and roll. The plurality of propeller assemblies are selected from the group consisting of (i) two fixed propeller assemblies and a tiltable propeller assembly, and (ii) four fixed propeller assemblies. In the case of the two fixed propeller assemblies and a tiltable propeller assembly, the two fixed propeller assemblies are disposed on port and starboard and are coupled to the chassis, each coupled to a propeller, and the tiltable propeller assembly is disposed on tail and coupled to the chassis and a propeller, having a motor for tilting with respect to a vertical axis. In the case of the four fixed propeller assemblies, the four fixed propeller assemblies are disposed on port, starboard, fore, and tail and are coupled to the chassis, each coupled to a propeller. The UAV system further includes a boom having a boom propeller assembly, configured to selectively provide positive and negative rectilinear thrust vectors. In addition, the UAV system includes an end-effector coupled to a distal end of the boom, the end-effector having a force sensor configured to provide contact force between the end-effector and an object.

A method of operating an unmanned aerial vehicle (UAV) systems is also disclosed. The method includes providing vertical take-off and landing (VTOL) by propelling the UAV along six degrees of freedom including along a cartesian coordinate system (X, Y, Z), yaw, pitch, and roll by utilizing a plurality of propeller assemblies selected from the group consisting of (i) two fixed propeller assemblies and a tiltable propeller assembly, and (ii) four fixed propeller assemblies. In the case of the two fixed propeller assemblies and a tiltable propeller assembly, the two fixed propeller assemblies are disposed on port and starboard and are coupled to the chassis, each coupled to a propeller, and the tiltable propeller assembly is disposed on tail and coupled to the chassis and a propeller, having a motor for tilting with respect to a vertical axis, and. In the case of the four fixed propeller assemblies the four fixed propeller assemblies are disposed on port, starboard, fore, and tail and are coupled to the chassis, each coupled to a propeller. The method also includes propelling the UAV along a rectilinear vector, utilizing a boom having a boom propeller assembly, configured to selectively provide positive and negative thrust. In addition, the method includes interfacing with the UAV's environment by providing an end-effector coupled to a distal end of the boom. Furthermore, the method includes sensing contact force between the end effector and an object by a force sensor coupled to the end effector.

BRIEF DESCRIPTION OF DRAWINGS

FIGS. 8A, 8B, and 8C are photographs of the UAV system of the present disclosure operating the second task according to FIG. 6 while the UAV system is in the air.

DETAILED DESCRIPTION

Figure 1:
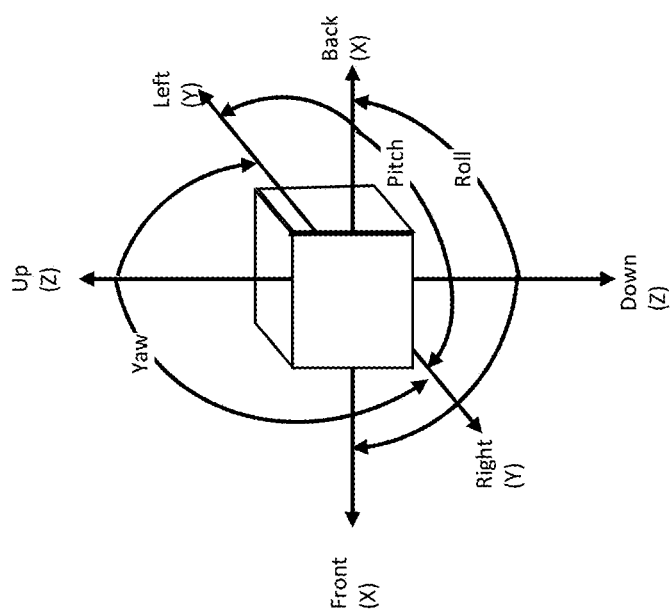
FIG. 1 is a schematic of an unmanned aerial vehicle (UAV) operating about six degrees of freedom.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

Figure 2:
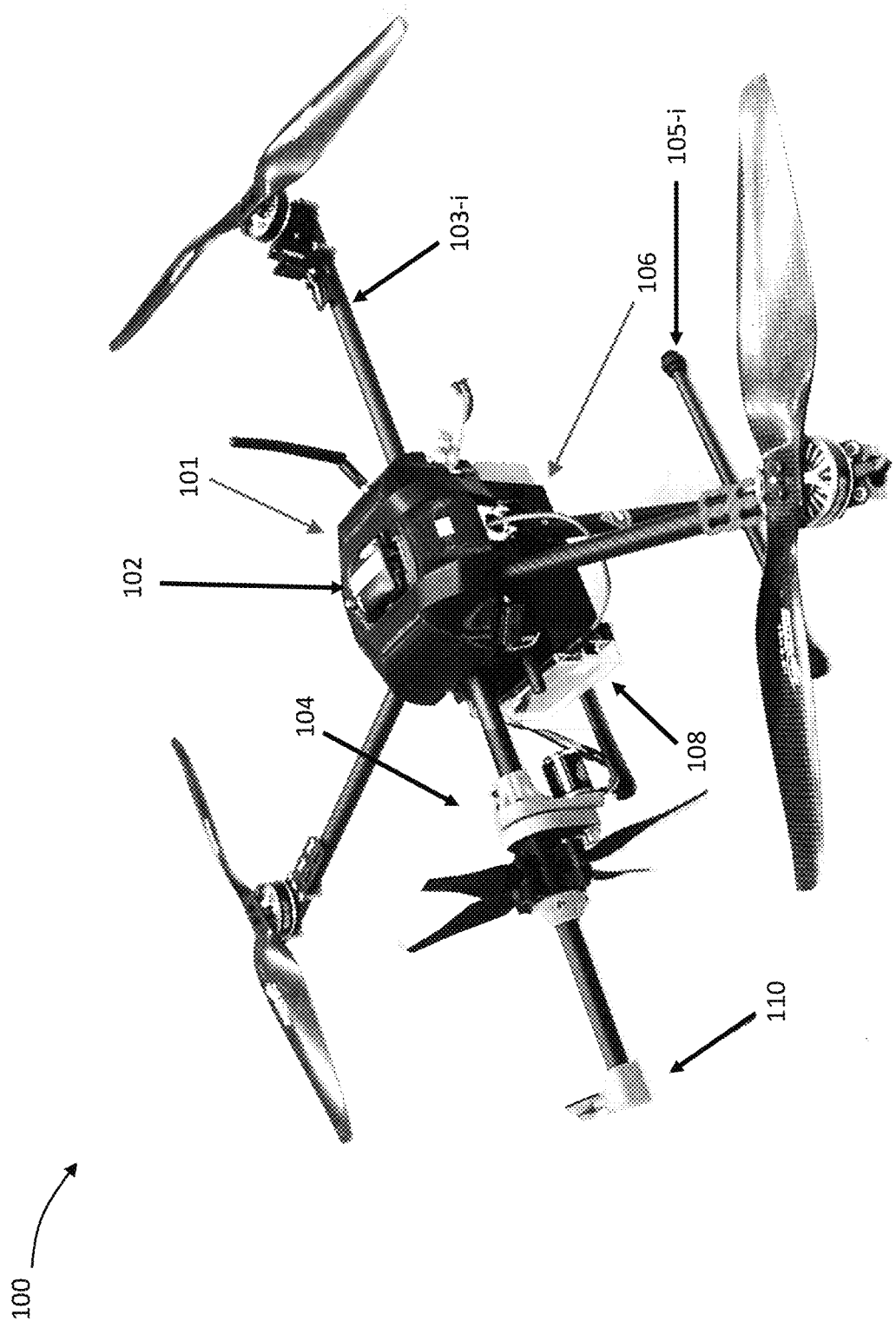
FIG. 2 is a photograph of a UAV system according to the present disclosure showing a tricopter having a propeller chassis, a controller, and a flight controller.

A novel approach to control UAVs such that these vehicles can perform tedious tasks within an environment by decoupling propulsion in a plurality of degrees of freedom is disclosed. Referring to FIG. 2, a photograph of an unmanned aerial vehicle (UAV) system 100, according to the present disclosure, is shown. The UAV system 100 is in the form of a tricopter (i.e., three propulsion mechanisms—discussed below, e.g., propellers, adapted to provide propulsion for flying), however, other approaches such as a quacopter. In each of these approaches, the UAV includes propellers with vertical take-off and landing (VTOL) capabilities. The UAV system 100 includes a flight controller 102 (not visible at the angle shown but provided under the component with the white strip), propeller assembly 103-$i$—there are 3 propeller assemblies (i.e., i=1, 2, 3) in the UAV system 100 shown in FIG. 2, a boom propeller assembly 104, landing base 105-$i$—there are 2 landing bases (i.e., i=1, 2) in the UAV system 100 shown in FIG. 2, one or more batteries 106 (collectively referred to as battery 106), a controller 108, and an end effector 110. It should be noted that the propeller assemblies 103-1 and 103-2 are fixed, and the propeller assembly 103-3 is capable of being tilted by including a servo motor, as described further below. Each of the propeller assemblies 103-$i$ is coupled to a base platform 102 which also houses the flight controller 102, the battery 106, and the controller 108. The flight controller 102 and controller 108 are shown as two different controllers (the former to manage flight of the UAV system 100, and the latter to manage operations of the boom propeller assembly 104), however, the functions in these can be performed in a single controller (not shown). The landing base 105-$i$ is an inverted T-shaped assembly that is coupled to the base platform 101 and is adaptable to allow the UAV system 100 to land securely on a surface. The boom propeller assembly 104 terminates in an end-effector 110 adaptable to interface with the UAV's environment, as described further below.

Figure 3:
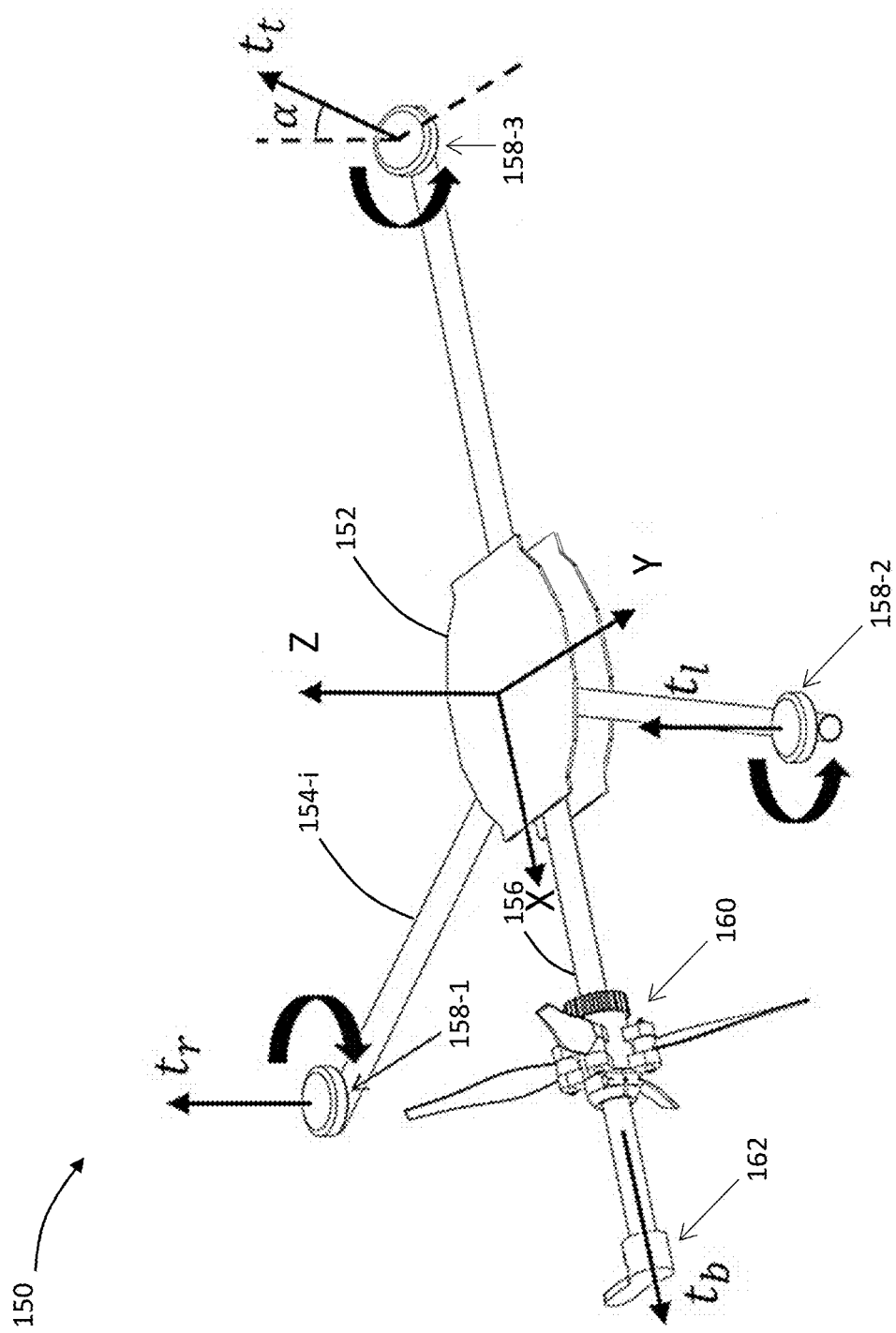
FIG. 3 is a perspective schematic of the propeller chassis of FIG. 2 showing three propeller heads and a boom propeller assembly.

Referring to FIG. 3, a perspective view of a propeller chassis 150 is shown. The propeller chassis 150 is the backbone of the propeller assembly 103-$i$ and the boom propeller assembly 104, providing those assemblies with a structure from which these assemblies can extend outwards. The propeller chassis 150 includes a base 152, which includes one or two plates upon which and coupled to are other components such as the base platform 101, the flight controller 102, the landing base 105-$i$, the battery 106, and the controller 108. Each of the propeller assemblies 103-$i$ (see FIG. 2) extend out of the base platform 101 at an equi-angle with respect to one-another—in the case of the tricopter shown in FIGS. 2 and 3, the angle (not shown) is 120°. In addition, each of the propeller assemblies 103-$i$ (see FIG. 2), includes propeller shaft 154-$i$—there are 3 propeller shafts (i.e., i=1, 2, 3) in the propeller chassis 150 shown in FIG. 3, terminating at a propeller head 158-$i$—there are 3 propeller heads (i.e., i=1, 2, 3) in the propeller chassis 150 shown in FIG. 3. In addition, a boom shaft 158 extends out of the base platform 101 which is coupled to a boom propeller head 160, which is coupled to the end effector 162.

A cartesian coordinate system is shown atop the base 152, indicating three degrees of freedom (i.e., along X—forwards and backwards; along Y—side-to-side; and along Z—up and down). While not shown, roll, pitch, and yaw are the other three degrees of freedom (example shown in FIG. 1), which can be achieved by a right-handed rotation about the X, Y, and Z axes, respectively. At the end of each propeller head 158-$i$, is a vector identified by t. For example, the propeller head 158-1 has a vector identified as $t_r$ for the right-side thrust, the propeller head 158-2 has a vector identified as $t_l$ for the left-side thrust, and propeller head 158-3 has a vector identified as $t_t$ for the tail-side thrust. The propeller head 158-3 with its $t_t$ thrust vector can be tilted (as shown with angle α) with respect to a vertical line passing through the center of the propeller head 158-3. Similarly, the boom propeller head 160 has a vector identified as $t_b$ for the boom thrust. The boom propeller head 160 can generate a positive or negative thrust ($t_b$) by rotating its associated propellers clockwise or counter-clockwise, causing the UAV system 100 (see FIG. 2) to push forward or pull backwards.

It should be appreciated that the propeller heads 158-$i$ can include electrical motors (e.g., direct current or alternating current motors), each independently rotating with respect to one another. On the other hand, each propeller head 158-$i$ can be a gearbox translating rotational motion within or by the propeller shaft 154-$i$ from a main gearbox (not shown) in the base 152 to the associated propeller of the propeller head 158-$i$. In addition, it should be appreciated that the boom propeller heads 160 can include an electrical motor (e.g., direct current or alternating current motors), independently rotating with respect to other propeller heads. On the other hand, the boom propeller head 160 can be a gearbox translating rotational motion within or by the boom shaft 156 from a main gearbox (not shown) in the base 152 to the boom propeller head 160.

Figure 4:
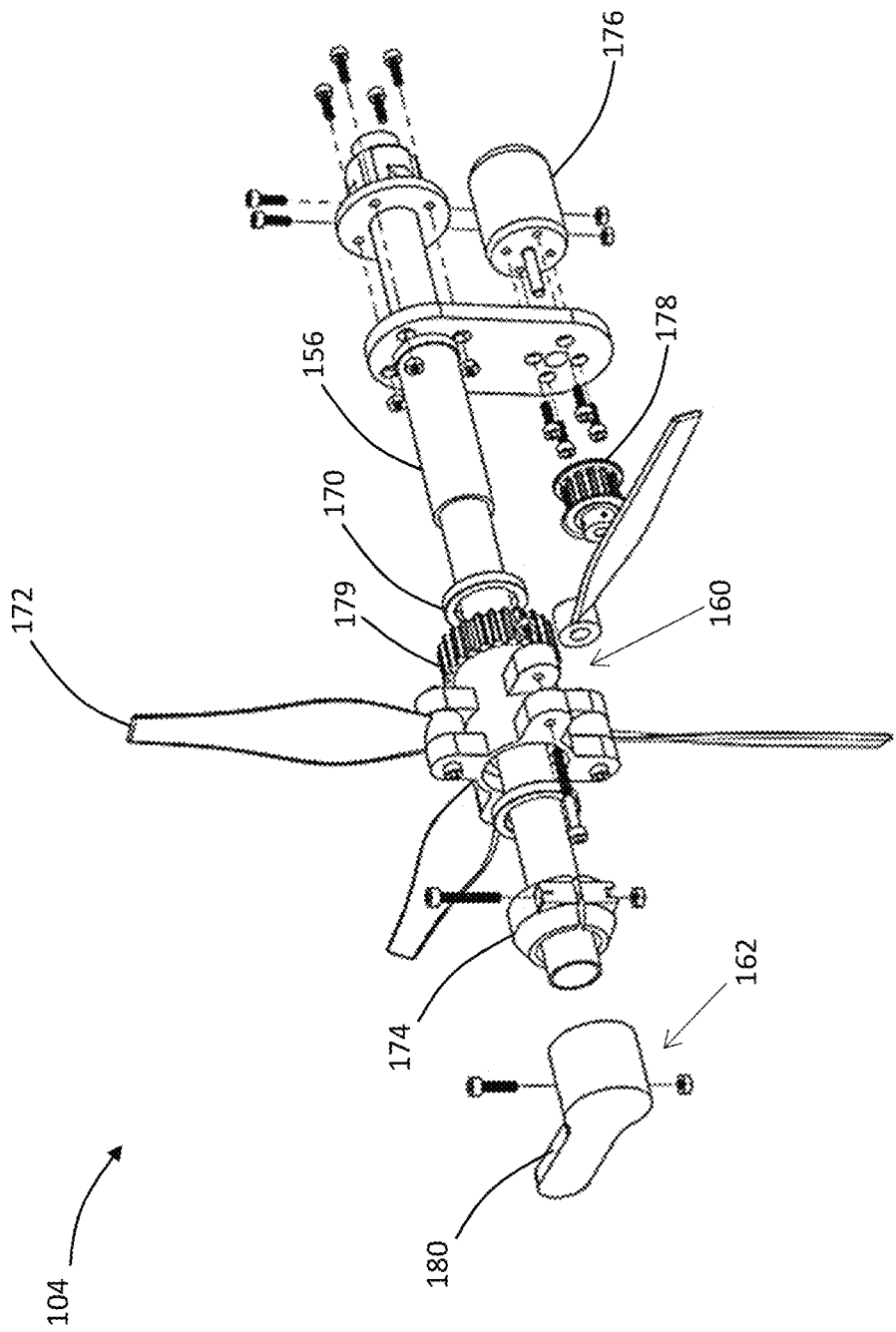
FIG. 4 is a perspective view of the boom propeller assembly of FIG. 3.

Referring to FIG. 4, a closer perspective view of the boom propeller assembly 104 is provided. Propellers 172 are coupled to the boom propeller head 160, capable of generating forward/reversed thrusts based on the direction of rotation (clockwise, counter clockwise). As discussed above, the boom propeller assembly 104 includes a boom shaft 156 coupled to the boom propeller head 160 via a bearing 172. The boom shaft 156 terminates at a collar 174 to which the end effector 162 is coupled. The end effector 162 can be constructed according to one or more embodiments. In the embodiment shown, the end effector 162 includes a force sensor 180 capable of providing a force signal to the controller 108 so that it can adjust the forward/reverse boom thrust $t_b$, discussed above.

In the embodiment shown in FIG. 4, the boom propeller assembly 104 also includes an electric motor 176, that is coupled to a timing pulley 178 which is coupled to an interface gear 179. The motor 176 via the timing pulley 178 can rotate the propellers 172 independent from the other propellers coupled to the propeller heads 158-$i$.

The UAV system 100 can operate in two modes: the tricopter mode where it moves similar to a conventional UAV without engaging the boom propeller head 160, and the boom propeller mode where when the UAV system 100 is generally hovering at a desired position, it uses the boom propeller head 160 for forward/reverse motion.

Figure 5:
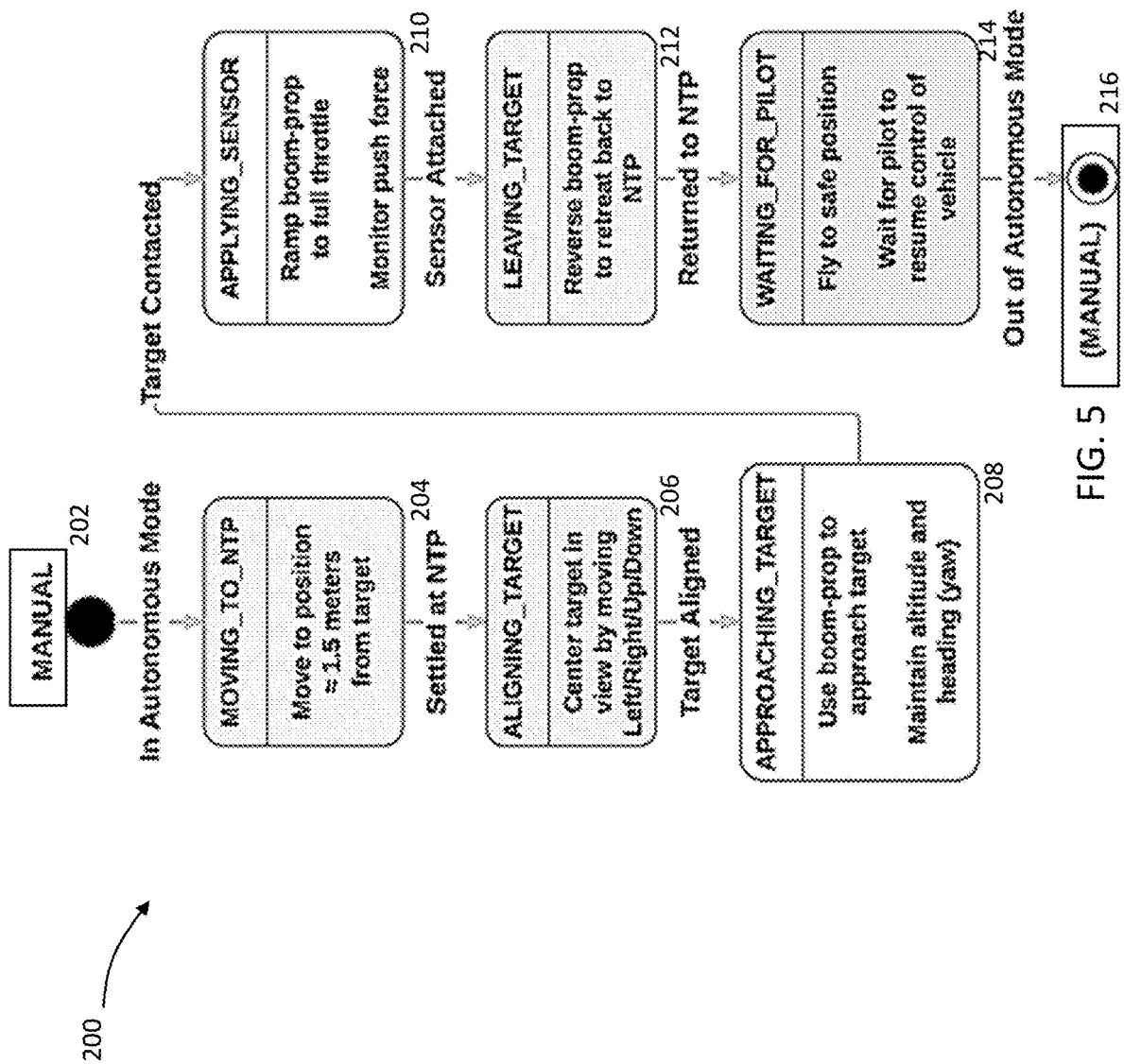
FIG. 5 is a flowchart showing the steps for accomplishing a first task by the UAV system of the present disclosure.

Referring to FIG. 5, a flowchart 200 providing steps in controlling the boom propeller head 160 is depicted. The control embodiment shown is for the UAV system 100 to perform the task of attaching a sensor (e.g., a vibration sensor) to a desired location (e.g., a bridge). The UAV system 100 is initially maneuvered using a manual operation as shown in block 202 and maneuvered to a desired position (e.g., in proximity to a structure). At this point, the controller 108 enters into an autonomous mode to accomplish the task (i.e., placing a device on a structure). In block 204, the controller 108 along with the flight controller 102 maneuver the UAV system 100 to within about 1.5 meters of a target placed on a structure. The UAV system 100 can determine distance from a target by utilizing a sonar sensor, known to a person having ordinary skill in the art, on the end-effector 162, a UAV mounted RGB-D sensor, known to a person having ordinary skill in the art, that provides depth information, or by tracking a landmark of known size in an RGB camera image from a camera mounted to the UAV, a technique known to a person having ordinary skill in the art. Using a vision system, described below, the controller 108 along with the flight controller 102 maneuver the UAV system 100 to center a target positioned on the structure within a view field as shown in block 206. At this point the controller 108 actuates the boom propeller head 160 to cause the UAV system 100 to approach the target, as shown in block 208. Once the end effector assembly 162 has made contact with the structure, as shown in block 210, the boom propeller head 160 is placed in a throttle position to apply a prescribed force to a sensor onto the structure. The force sensor 180 at the end of the end effector assembly 162 provides a feedback signal to the controller 108 in order to determine the throttle percentage of the boom propeller head 160. Once the sensor has been installed on the structure, as shown in block 212, the controller 108 reverses the rotation of the boom propeller head 160 to cause the UAV system 100 to retreat from the structure. Thereafter, as shown in block 214, the controller 108 and the flight controller 102 move the UAV system 100 a predetermined distance away from the structure and maintains hover at that position, awaiting resumption of flight by a pilot. Once the pilot moves the UAV system 100 out of the autonomous mode, it is placed back in the manual mode, as shown in block 216.

Figure 6:
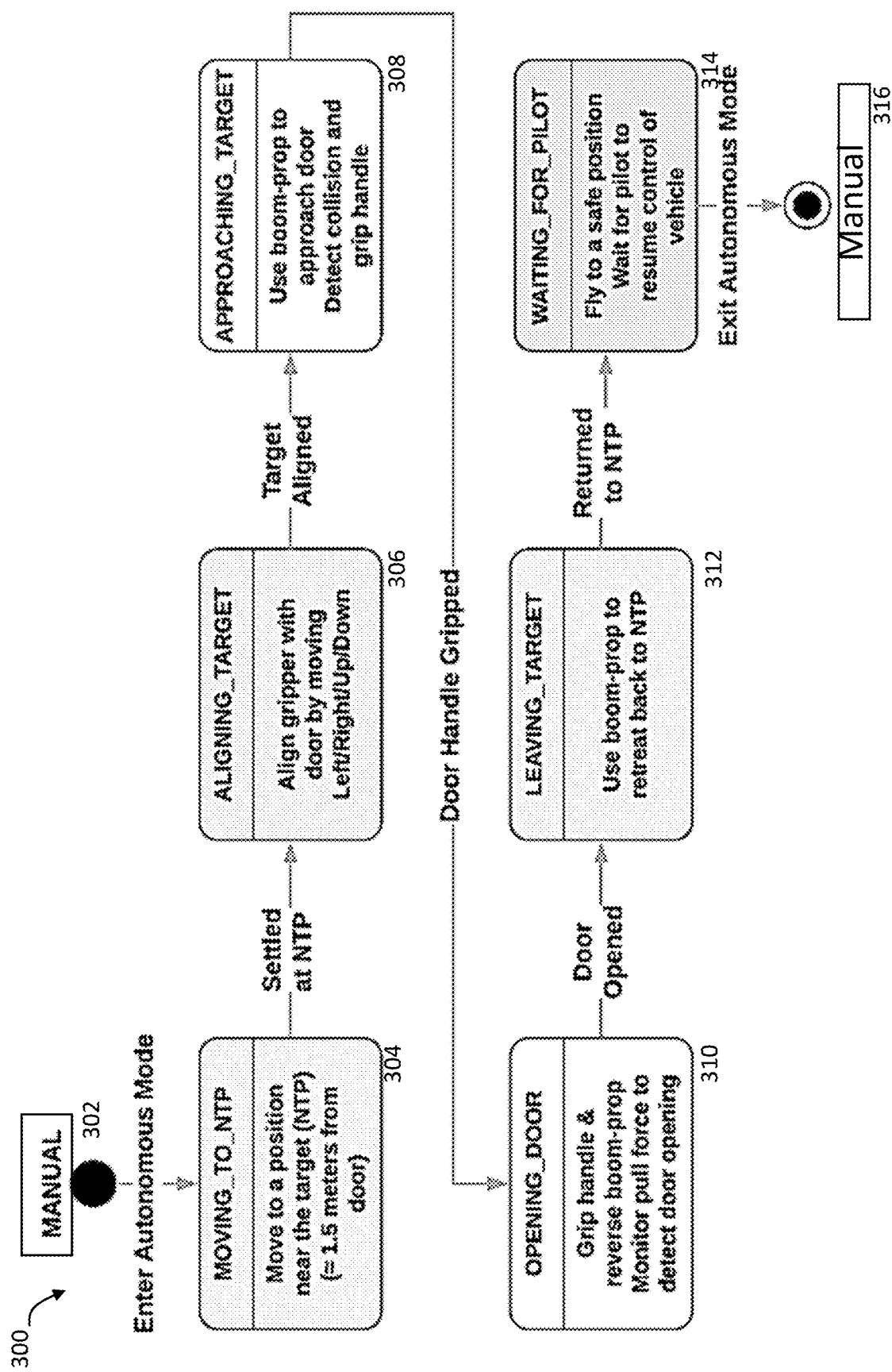
FIG. 6 is a flowchart showing the steps for accomplishing a second task by the UAV system of the present disclosure.
Figures 7A, 7B, 7C, 7D, 7E, 7F:
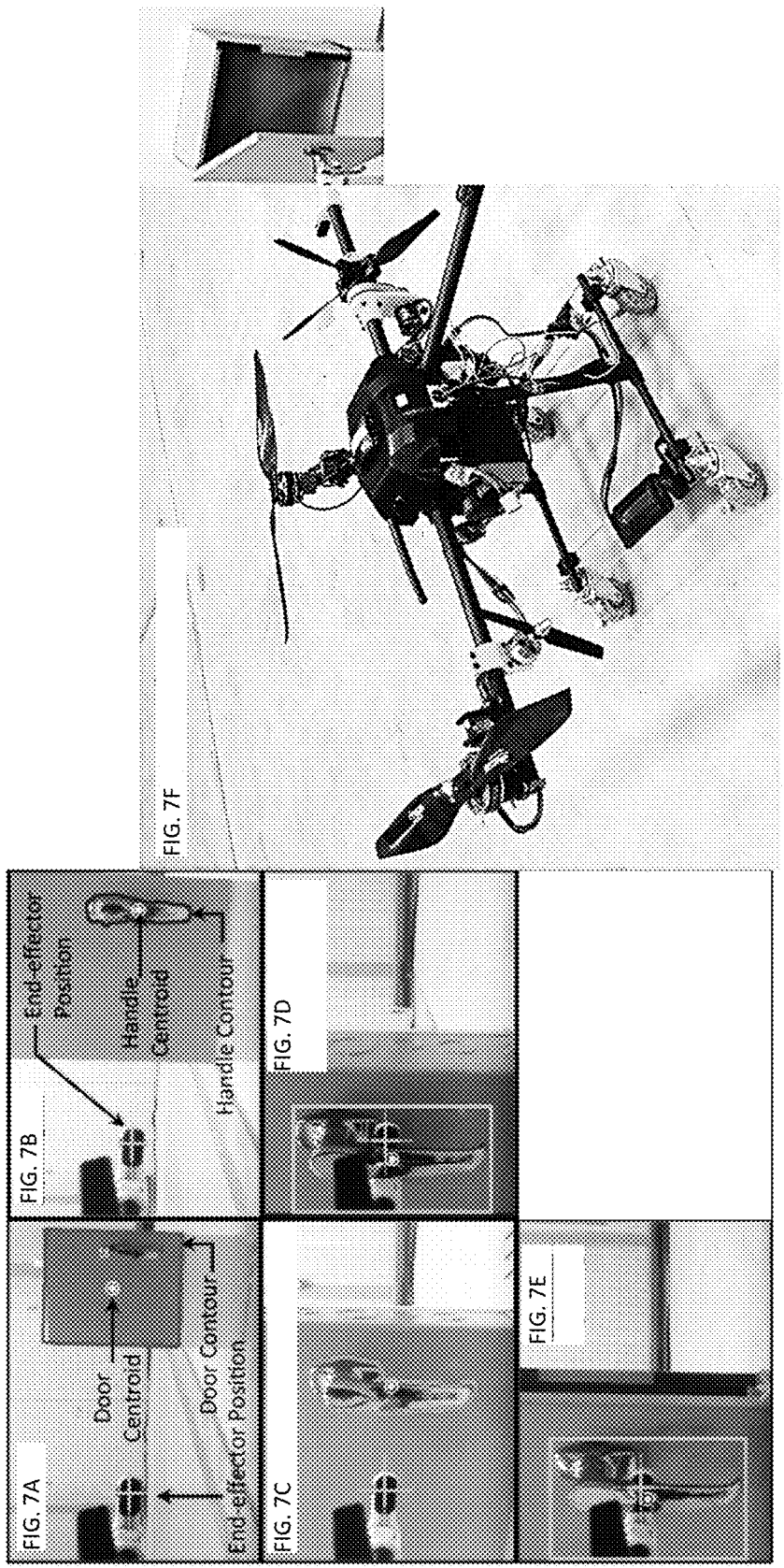
FIGS. 7A, 7B, 7C, 7D, 7E, and 7F are photographs of the UAV system of the present disclosure operating the second task according to FIG. 6 while the UAV system is on the ground.

Referring to FIG. 6, as well as FIGS. 7A-7F, a flowchart 300 and photos providing steps in controlling the boom propeller head 160 is depicted, for accomplishing a second task. The control embodiment shown is for the UAV system 100 to perform the task of opening a door to an electrical panel. The UAV system 100 is initially maneuvered using a manual operation as shown in block 302 and maneuvered to a desired position (e.g., in proximity to electrical panel). At this point, the controller 108 enters into an autonomous mode to accomplish the task (i.e., opening the door of the electrical panel). In block 304, the controller 108 along with the flight controller 102 maneuver the UAV system 100 to within about 1.5 meters of the door. The UAV system 100 can determine distance from a target by utilizing a sonar sensor, known to a person having ordinary skill in the art, on the end-effector 162, a UAV mounted RGB-D sensor, known to a person having ordinary skill in the art, that provides depth information, or by tracking a landmark of known size in an RGB camera image from a camera mounted to the UAV, a technique known to a person having ordinary skill in the art. Using a vision system, described below, the controller 108 along with the flight controller 102 maneuver the UAV system 100 to align gripper associated with the end effector assembly 162 with the door, as shown in block 306, and as shown in FIGS. 7A, 7B, and 7C (which represent photos of an on the ground door-opening task undertaken by the UAV system 100 in the autonomous mode) or as shown in FIG. 8A (which represent a photo of an in-air door-opening task undertaken by the UAV system 100 in the autonomous mode). At this point the controller 108 actuates the boom propeller head 160 to cause the UAV system 100 to approach the door, detect collision with the door and the end of the end effector assembly 162 and grip the handle on the door, as shown in block 308, and as shown in FIG. 7D, and FIG. 8B. Once the end effector assembly 162 has gripped the handle, as shown in block 310, the boom propeller head 160 is placed in a throttle position in the reverse direction to apply a prescribed pull force to the handle on the door, as shown in FIG. 7E, in which the chassis is shown with a plurality of wheels coupled to the chassis and configured to allow the chassis to move about a surface. The force sensor 180 at the end of the end effector assembly 162 provides a feedback signal to the controller 108 in order to determine the throttle percentage of the boom propeller head 160. Once the door is opened, as shown in block 312 and as shown in FIG. 7F and FIG. 8C, the controller 108 and the flight controller 102 moves the UAV system 100 to retreat to a point near the door. Thereafter, as shown in block 314, the controller 108 and the flight controller 102 move the UAV system 100 a predetermined distance away from the structure and maintains hover at that position, awaiting resumption of flight by a pilot. Once the pilot moves the UAV system 100 out of the autonomous mode, it is placed back in the manual mode, as shown in block 316.

Figure 9:
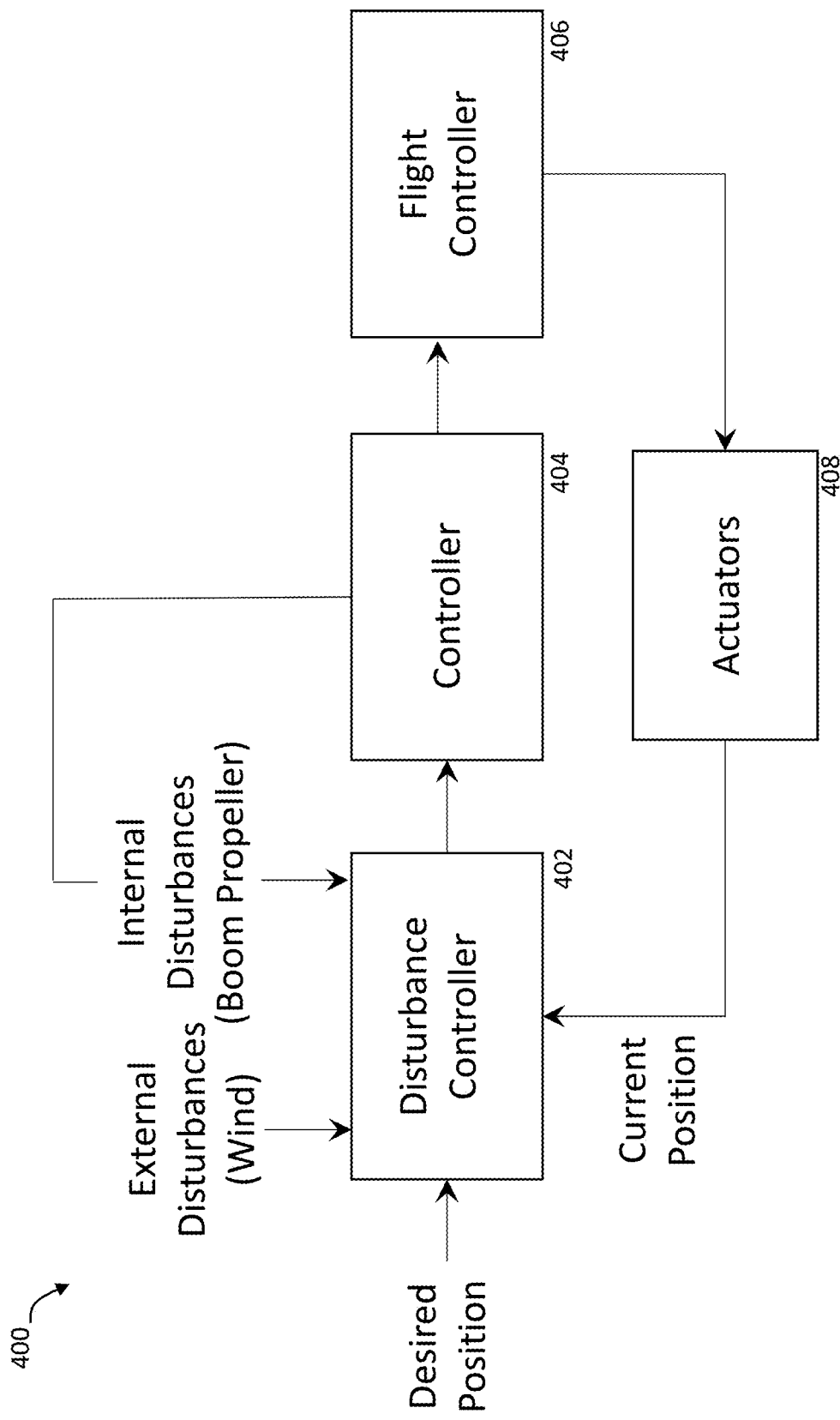
FIG. 9 is a block diagram of control blocks showing the interconnectivity of the controller and the flight controller of FIG. 2 and a disturbance controller block interacting with actuators on the UAV system of the present disclosure.

Referring to FIG. 9, a block diagram 400 for autonomous controlling of the UAV 100 system is shown. Disturbances for the UAV system 100 include external (e.g., wind), and internal (i.e., the torque exerted onto the UAV system 100 when the boom propeller head is activated). A disturbance controller 402, which can be part of the controller 108 or the flight controller 102, receives data from an inertial measurement unit (IMU) (not shown), known to a person having ordinary skill in the art. Based on the apriori knowledge of the boom propeller head 160 actuation and known torques exerted on the UAV system 100 thereby to distinguish between external and internal disturbances, as shown in block 402. The disturbance controller further receives as input the desired position and the signals associated with the current position and resolves a solution for the controller, as shown in block 404. As shown in block 406, the controller communicates with the flight controller, and it (or optionally the controller—that path not shown), determine actuation signal for the actuators as shown in block 408, which determine the current position. This information is then provided to the disturbance controller.

A vision-based control system using the OpenCV 3.0 framework was used for accomplishing tasks discussed herein. The size, shape, and aspect ratio of the door panel and door handle are predefined in an algorithm. The incoming video stream from a camera attached to the end effector assembly 162 is first converted into a stream of grayscale images. After an edge detection process, known to a person having ordinary skill in the art, the algorithm produces a closed contour image to match the predefined sizes/shapes of the door panel and/or handle. Detected contours that do not match are discarded. Centroids for the contour images are calculated next. Based on the position of the centroids, size/shape, and aspect ratios of the contours, and the (fixed) position of end effector assembly 162 in the image, the appropriate commands are sent to controller 108 which provides the appropriate commands for the motor 176.

While, the UAV system 100 (see FIG. 2) disclosed here includes three propeller head assemblies with the boom propeller, other configurations such as a quadcopter assembly is also possible. For example, a quadcopter can provide thrust vectors in all six degrees of freedom (see FIG. 1), while a boom propeller can provide a rectilinear thrust vector when the quadcopter is hovering at a desired position to accomplish the task discussed herein (e.g., attach a device, e.g., a vibration sensor, to an object, e.g., a bridge, or gripping an object, e.g., a door handle, and moving the object, e.g., opening the door). As such, other UAV configurations known to a person having ordinary skill in the art are also possible.

Those having ordinary skill in the art will recognize that numerous modifications can be made to the specific implementations described above. The implementations should not be limited to the particular limitations described. Other implementations may be possible.

The invention claimed is:

1. An unmanned ground-based system, comprising:
   a chassis;
   a plurality of wheels coupled to the chassis and configured to allow the chassis to move about a surface;
   a plurality of propeller assemblies configured to provide on-ground motion, the plurality of propeller assemblies each having a propeller include i) two fixed propeller assemblies disposed on port and starboard which are coupled to the chassis and ii) a tail fan, wherein the tail fan configured to apply forces to thereby generate yaw control to enable smooth on ground motion;
   a boom having a form of an elongated shaft extending from the chassis and having a boom propeller assembly with a boom propeller disposed on a plane generally perpendicular to the propellers of the fixed propeller assemblies, configured to independently and selectively provide positive and negative rectilinear thrust vectors; and
   an end-effector coupled to a distal end of the boom, the end-effector having a force sensor configured to provide contact force between the end-effector and an object, wherein the contact force is used as a feedback signal to determine magnitudes of the positive and negative rectilinear thrust vectors that are generated by the propeller of the boom propeller assembly.

2. The unmanned ground-based system of claim 1, the boom propeller assembly configured to rotate the boom propeller in a plane that is about perpendicular to a plane on which the propellers of the fixed propeller assemblies rotate.

3. The unmanned ground-based system of claim 2, the end-effector further comprising an arrangement for performing a first task.

4. The unmanned ground-based system of claim 3, wherein the first task is attaching a device to an object.

5. The unmanned ground-based system of claim 4, wherein the device is a sensor and the object is a bridge.

6. The unmanned ground-based system of claim 2, the end-effector further comprising an arrangement for performing a second task.

7. The unmanned ground-based system of claim 6, wherein the second task is gripping a handle coupled to a door and opening the door.

8. The unmanned ground-based system of claim 1, wherein each of the fixed propeller assemblies and the boom propeller assembly is operable by one of i) a dedicated motor, and (ii) a gear box utilizing a direct drive coupled to the chassis.

9. The unmanned ground-based system of claim 8, wherein the dedicated motor is a direct current motor.

10. The unmanned ground-based system of claim 8, wherein the dedicated motor is an alternating current motor.

11. A method of operating an unmanned ground-based system, comprising:
   providing on-ground motion by utilizing a plurality of propeller assemblies including i) two fixed propeller assemblies disposed on port and starboard which are coupled to a chassis and ii) a tail fan, wherein the tail fan configured to apply forces to thereby generate yaw control to enable smooth on ground motion;
   moving the unmanned ground-based system along a rectilinear vector, utilizing a boom having a form of an elongated shaft extending from the chassis and having a boom propeller assembly with a boom propeller disposed on a plane generally perpendicular to the propellers of the fixed propeller assemblies, configured to independently and selectively provide positive and rectilinear negative thrust vector;
   interfacing with the unmanned ground-based system's environment by providing an end-effector coupled to a distal end of the boom; and
   sensing contact force between the end effector and an object by a force sensor coupled to the end effector, wherein the contact force is used as a feedback signal to determine the magnitudes of positive and negative rectilinear thrust vectors that are generated by the propeller of the boom propeller assembly.

12. The method of claim 11, the boom propeller assembly configured to rotate the boom propeller in a plane that is about perpendicular to a plane on which the propellers of the fixed propeller assemblies rotate.

13. The method of claim 12, further comprising:
   performing a first task by the end-effector.

14. The method of claim 13, wherein the first task is attaching a device to an object.

15. The method of claim 14, wherein the device is a sensor and the object is a bridge.

16. The method of claim 12, further comprising:
   performing a second task by the end-effector.

17. The method of claim 16, wherein the second task is gripping a handle coupled to a door and opening the door.

18. The method of claim 11, wherein each of the fixed propeller assemblies and the boom propeller assembly is operable by one of i) a dedicated motor, (ii) and a gear box utilizing a direct drive coupled to the chassis.

19. The method of claim 18, wherein the dedicated motor is a direct current motor.

20. The method of claim 18, wherein the dedicated motor is an alternating current motor.

* * * * *